US010550997B2

(12) United States Patent
Powell (10) Patent No.: US 10,550,997 B2
(45) Date of Patent: Feb. 4, 2020

(54) LUBRICATION PUMP

(71) Applicant: FD Johnson Company, Twinsburg, OH (US)

(72) Inventor: John H. Powell, Ravenna, OH (US)

(73) Assignee: FD Johnson Company, Twinsburg, OH (US)

( * ) Notice: Subject to any disclaimer, the term of this patent is extended or adjusted under 35 U.S.C. 154(b) by 206 days.

(21) Appl. No.: 15/709,934

(22) Filed: Sep. 20, 2017

(65) Prior Publication Data

US 2018/0087492 A1 Mar. 29, 2018

Related U.S. Application Data

(60) Provisional application No. 62/398,934, filed on Sep. 23, 2016.

(51) Int. Cl.

| F16N 13/04 | (2006.01) |
|---|---|
| F04B 9/04 | (2006.01) |
| F16J 1/12 | (2006.01) |
| F04B 53/06 | (2006.01) |
| F04B 53/10 | (2006.01) |
| F04B 49/12 | (2006.01) |

(Continued)

(52) U.S. Cl.
CPC .............. *F16N 13/04* (2013.01); *F04B 9/042* (2013.01); *F04B 9/045* (2013.01); *F16J 1/12* (2013.01); *F04B 19/22* (2013.01); *F04B 49/128* (2013.01); *F04B 53/06* (2013.01); *F04B 53/10* (2013.01); *F04B 53/14* (2013.01); *F04B 53/16* (2013.01)

(58) Field of Classification Search
CPC .......... F16N 13/04; F04B 9/042; F04B 9/045; F04B 53/14; F04B 19/22; F16J 1/20
See application file for complete search history.

(56) References Cited

U.S. PATENT DOCUMENTS

| 4,938,316 | A | * | 7/1990 | Ichikawa | ............... F04C 14/06 |
|---|---|---|---|---|---|
|  |  |  |  |  | 184/27.1 |
| 9,151,444 | B2 |  | 10/2015 | Powell |  |
| 2015/0129064 | A1 | * | 5/2015 | Reilly | .................... F04B 1/128 |
|  |  |  |  |  | 137/605 |

FOREIGN PATENT DOCUMENTS

DE 102010031646 A1 * 1/2012 ............. F02M 9/102

OTHER PUBLICATIONS

Machine translation of DE 10 2010 031 646 A1 (Year: 2010).*

(Continued)

*Primary Examiner* — Michael C McCullough
(74) *Attorney, Agent, or Firm* — Renner, Otto, Boisselle & Sklar, LLP (57) ABSTRACT

A lubrication pump includes a housing defining a bore, an adjustable cylinder sleeve within the bore, and a piston slidably movable within the bore along a longitudinal axis of the bore. A connector may be drivingly interposed between a cam and the piston for driving the piston in reciprocating axial motion. The connector may have a coupling for engaging the piston, which may enable rotational engagement between the connector and the piston. The connector may have a roller for bearing engagement with the cam, which may enable the connector to rotate about the longitudinal axis relative to the housing as the connector moves axially within the bore. The cam may be laterally displaceable relative to the connector. The cylinder sleeve may be adjustable relative to the piston for varying lubricant fluid output flow. The cylinder sleeve and corresponding piston may be interchangeably disposed in the housing.

20 Claims, 4 Drawing Sheets

(51) Int. Cl.
*F04B 53/16* (2006.01)
*F04B 53/14* (2006.01)
*F04B 19/22* (2006.01)

(56) References Cited

OTHER PUBLICATIONS

T.F. Hudgins Incorporated; PE AD Lubrication Pump; dated Apr. 20, 2011 (p. 13); retrieved online on Aug. 27, 2019 at http://www.tfhudgins.com/files/comm_id_21/Lubrication_Pump_Manual.pdf.

* cited by examiner

LUBRICATION PUMP

RELATED APPLICATIONS

This application claims the benefit of U.S. Provisional Application No. 62/398,934 filed Sep. 23, 2016, which is hereby incorporated herein by reference.

FIELD OF INVENTION

The present invention relates generally to a lubrication system, and more particularly to a lubrication pump for delivering lubricant through the lubrication system.

BACKGROUND

Centralized lubrication systems are widely used in industrial and heavy-duty mobile equipment applications to lubricate bearing surfaces on a machine. The centralized lubrication system uses a lubrication pump to deliver controlled amounts of lubricant, such as grease or oil, from a reservoir through one or more fluid conduits to lubricate the bearing surfaces of one or more machines. The lubrication pump typically includes a motor that drives a camshaft, which in turn drives a piston within a bore of a pump housing. As the piston moves back and forth within the housing bore, the lubricant fluid is forced to flow from a supply passage in the pump housing through the bore to an exhaust passage for delivery to the lubrication point. Often a plurality of pistons and housing bores are provided by the pump to deliver the lubricant to multiple points on the machine or to multiple machines.

SUMMARY OF INVENTION

While known lubrication pumps of the type described above may have one or more pistons actuated by a camshaft within a housing bore to provide lubricant fluid flow, these pistons typically require accurate alignment with the camshaft and the housing bore to prevent lateral loading of the piston against the housing surface defining the bore. This lateral loading may increase wear between the piston and the housing surface defining the bore, thereby reducing tolerances and the life of the lubrication pump. Such accurate alignment and tighter tolerances for preventing such lateral loading also may increase the time and cost to manufacture the lubrication pump. In addition, known lubrication pumps are not easily adaptable to adjust pump output flow, and may require separate pumps with different sized pistons or bores to achieve the desired output fluid flow.

According to one aspect of the invention, a lubrication pump is provided that reduces the need for accurate alignment of pump components, which may reduce lateral wear during operation, and which also may reduce the cost and time to manufacture the pump.

For example, the lubrication pump may include a connector drivingly interposed between an eccentric cam and a piston, where the connector includes a roller in bearing engagement with the eccentric cam. This enables the connector to align with and engage the cam as the cam rotates, thereby enabling the connector to drive the piston in reciprocating motion within a bore defined by the housing of the pump.

More particularly, the roller may be a free-floating spherical ball contained within a recess of the connector, and the eccentric cam may have a circumferential cam groove configured to receive and guide the ball. The free-floating ball may enable the connector to freely rotate about a longitudinal axis of the housing bore as the connector and piston are driven in reciprocating motion by virtue of the ball rolling within the eccentric cam groove. Such a configuration that allows the connector to freely rotate relative to the housing in this way may eliminate the need for an alignment key that constrains rotational movement between the connector and the housing surface that defines the bore.

In some embodiments, the eccentric cam may be slidably disposed on a drive shaft such that the cam is laterally displaceable relative to the connector and the housing bore. Such a configuration allows the eccentric cam to self-align with the connector and the bore, which may be facilitated via engagement of the roller within the cam groove. This self-alignment also may reduce the need for alignment keyways between the cam and drive shaft.

The connector also may include a coupling opposite the roller that enables relative rotation between the connector and the piston while maintaining an axial connection. For example, the connector may have a transverse slot configured to receive a corresponding protrusion of the piston for enabling such relative rotation. The transverse slot also may enable driving engagement between the connector and piston for common axial movement of both within the housing bore. Such a configuration may provide positive engagement between the connector and piston for axial movement back and forth within the bore, and also may reduce the potential for concentricity or binding issues between these components.

Such configuration(s) may improve alignment and binding issues during operation of the pump, and also may improve the ability to quickly align such components during assembly of the pump.

According to another aspect of the invention, a lubrication pump is provided that facilitates adjustment of the flow of lubricant through the pump, and which may enable a broader range of lubricant output flow provided by the pump.

For example, the lubrication pump may include an adjustable cylinder sleeve disposed within the housing bore for cooperating with the piston. The adjustable cylinder sleeve may cooperate with the piston to define a fluid chamber through which the lubricant fluid flows, and the cylinder sleeve may be adjustable relative to the piston to vary the volume of the fluid chamber. Such an adjustable sleeve may thereby enable lubricant output fluid flow to be easily adjusted.

The lubrication pump also may provide the ability to easily adapt different sized pistons by interchanging cylinder sleeves having different sized internal bores. In this manner, the interchangeable cylinder sleeves may have the same external configuration for being disposed within the same pump housing, but may change the internal cylinder bore configuration for cooperating with different sized pistons to adjust output fluid flow. In addition, the different sized pistons may easily be adapted to drivingly engage with the same connector simply by adapting the protrusion of the piston to be slidably received within the transverse slot of the connector. Such configuration(s) enhance the modularity and flexibility of design of the lubrication pump.

The lubrication pump may have multiple pistons slidably disposed within multiple bores. The pistons and the internal bores may be different sizes, which may enhance the lubricant fluid output range of the pump.

The cylinder sleeve also may include a plug or closure toward one end of the internal cylinder bore. The plug may have a through-passage for enabling trapped gas to escape from the pump.

In addition, each internal bore may be in fluid communication with a supply passage and an exhaust passage for delivering one or more types of lubricant. In some embodiments, one or more supply passages for respective internal bores may be fluidly connected together via one or more cross-passages, and the cross-passages may have a plug or closure configured to open or close the flow path between supply passages.

According to one aspect of the invention, a lubrication pump includes a housing defining an internal housing bore having a longitudinal axis; a piston slidably movable within the internal housing bore along the longitudinal axis; a drive shaft having an eccentric cam, the eccentric cam being rotatable with the drive shaft relative to the housing; and a connector drivingly interposed between the eccentric cam and the piston, the connector having a first end portion configured to engage the piston and a second end portion opposite the first end portion configured to engage the eccentric cam; where the connector includes a roller disposed at the second end portion, the roller being in bearing engagement with the eccentric cam thereby enabling the connector to drive the piston in reciprocating movement along the longitudinal axis in response to the rotation of the eccentric cam.

According to another aspect of the invention, a lubrication pump includes a housing defining an internal housing bore having a longitudinal axis; a piston slidably movable within the internal housing bore along the longitudinal axis; a drive shaft having an eccentric cam, the eccentric cam being rotatable with the drive shaft relative to the housing; and a connector drivingly interposed between the eccentric cam and the piston, the connector having a first end portion configured to engage the piston and a second end portion opposite the first end portion configured to engage the eccentric cam; where the connector includes a free-floating ball disposed at the second end portion, and the eccentric cam has a circumferential cam groove configured to receive and guide the free-floating ball; and where the eccentric cam is slidably disposed on the drive shaft such that the eccentric cam is laterally displaceable along the drive shaft relative to the connector for enabling self-alignment between the connector and the eccentric cam when the free-floating ball is guidably received in the circumferential cam groove.

According to another aspect of the invention, a lubrication pump includes a housing defining an internal housing bore having a longitudinal axis, the housing having a supply fluid passage and an exhaust fluid passage; a cylinder sleeve disposed within the internal housing bore, the cylinder sleeve having an internal cylinder surface defining an internal cylinder bore; a piston slidably movable within the internal cylinder bore along the longitudinal axis, the piston cooperating with the internal cylinder surface to define a variable fluid chamber; and a drive shaft having an eccentric cam, the eccentric cam being rotatable with the drive shaft relative to the housing and configured to drive the piston in reciprocating motion along the longitudinal axis within the internal cylinder bore; where the cylinder sleeve is axially adjustable relative to the internal housing bore to vary a volume of the variable fluid chamber.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

DETAILED DESCRIPTION

The principles of the present invention have particular application to lubrication pumps for delivering a lubricant, such as grease or oil, through a lubrication system for industrial or heavy-duty mobile equipment applications, and will be described below chiefly in this context. Principles of this invention may be applicable to lubrication systems for other applications, however, including any application where it is desirable to improve the design flexibility, cost, or life of the lubrication pump, among other considerations.

Figure 1:
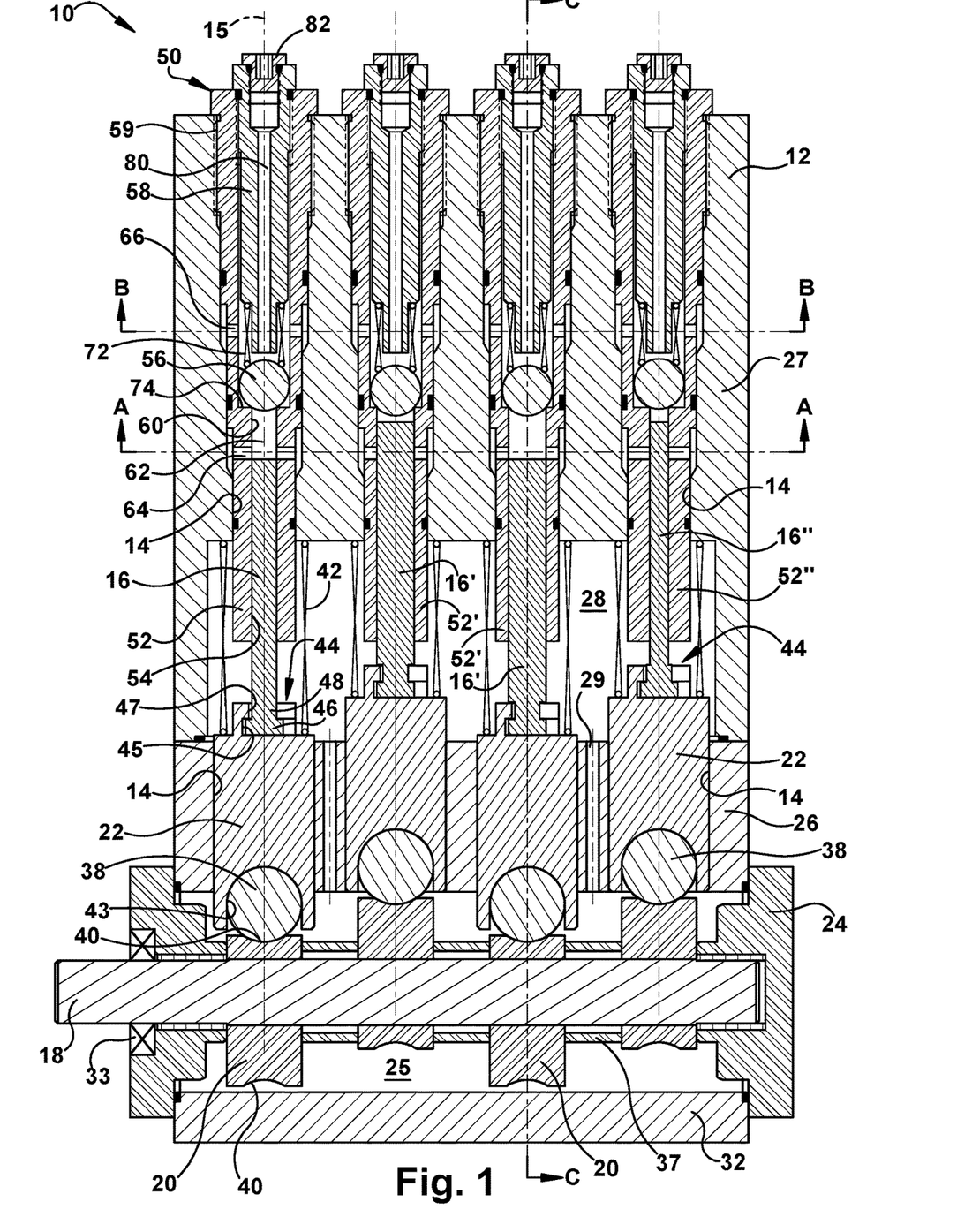
FIG. 1 is a cross-sectional side view of an exemplary lubrication pump according to an embodiment of the invention.

Turning to FIG. 1, a cross-sectional side view of an exemplary lubrication pump 10 is shown. The lubrication pump 10 generally includes a housing 12 defining an internal housing bore 14, a piston 16 slidably movable within the internal housing bore 14 along a longitudinal axis 15, a drive shaft 18 having an eccentric cam 20, and a connector 22 configured to engage the eccentric cam 20 and the piston 16 for imparting reciprocating driving motion to the piston 16 within the internal housing bore 14.

As shown, the lubrication pump 10 may include one or more pistons 16 slidably disposed in one or more internal housing bores 14, and may have one or more corresponding connectors 22 and cams 20 for imparting reciprocating motion to the one or more pistons 16. In exemplary embodiments, the one or more pistons 16 may be the same, or the one or more pistons 16 may be different. For example, in the illustrated embodiment, the lubrication pump 10 includes two pistons 16' that are the same as each other, and two pistons 16 and 16" that are different from the other pistons. The piston housing may include more or fewer than four pistons, however, such as 1, 2, 4, 8, 10 or more pistons including corresponding bores, connectors, cams, and the like.

The housing 12 may be formed from segments that are coupled together to form an integral structure, or the housing 12 may be a single unitary construction. In the illustrated embodiment, the housing 12 includes a lower housing portion 24 which defines a lower chamber 25 that contains the drive shaft 18 and cam 20, an intermediate housing portion 26 that defines a portion of the housing bore 14 containing the connector 22, and an upper housing portion 27 that defines an intermediate chamber 28 and which also defines a portion of the housing bore 14 containing the piston 16.

The lower chamber 25 may be in fluid communication with the intermediate chamber 28 via one or more fluid passages 29. The respective chambers 25, 29 may be filed with oil or other such fluid to lubricate the moving parts, including the pistons 16, the connectors 22, the cams 20, and the drive shaft 18. The chambers 25, 28 may be filled via a fill port 30 (shown in FIG. 4, for example), and may be drained via a drain port 31 (shown in FIG. 4, for example).

The lower housing portion 24 also may have a base 32, and may have bearing surfaces 33 that facilitate rotation of the drive shaft 18 relative to the housing 12. As shown, the drive shaft 18 is arranged horizontally or transverse to the housing bore 14, and the housing bore 14 is disposed vertically in the housing 12 along the longitudinal axis 15. In a known manner, the drive shaft 18 may be operatively rotated by a motor (not shown), which may include gear reducers or torque transmitters for driving the drive shaft 18 at a desired speed or torque.

The eccentric cams 20 may be slidably disposed on the drive shaft 18 such that the cams 20 are free to be displaced laterally relative to the respective connectors 22. Each cam 20 may define a through-hole 34 having opposite flat sides 35 that are configured to engage corresponding flat sides 36 of the drive shaft 18 which enables the drive shaft to engage and rotate the cam (shown in FIG. 4, for example). Such a configuration in which the cams 20 are laterally displaceable in this manner allows the cams 20 to self-align with the connector 22 and the internal housing bores 14. This improves assembly and operation of the lubrication pump 10. Such a configuration also may reduce the need for alignment keyways between the cam 20 and the drive shaft 18. As shown, spacers 37 or collars may be disposed on the drive shaft 18 between the respective cams 20 to take up excess space and to constrain the cams 20 from too much lateral movement during operation.

The connectors 22 are drivingly interposed between the eccentric cams 20 and the pistons 16, and are configured to impart reciprocating axial motion to the pistons 16 in response to the rotational motion of the cams 20. In this manner, each connector 22 may have a first end portion configured to engage the piston 16, and a second end portion opposite the first end portion configured to engage the eccentric cam 20. The connector 22 may be slidably movable along the longitudinal axis 15 within the internal housing bore 14, and may be laterally constrained by the housing surface that defines the housing bore 14.

Figure 2:
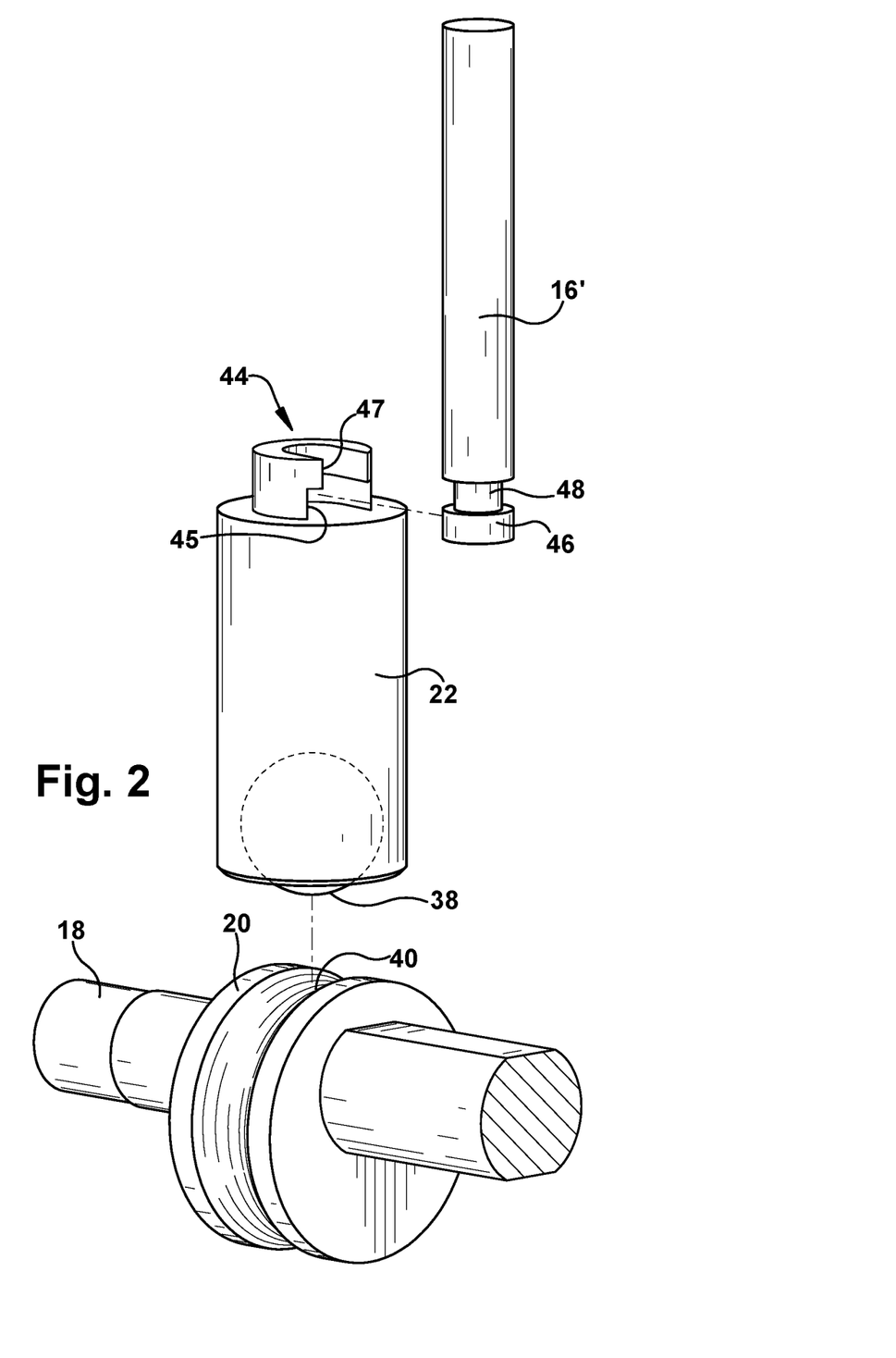
FIG. 2 is a perspective partially exploded view of a connector, a piston, and an eccentric cam of the lubrication pump in FIG. 1.

In exemplary embodiments, as shown in FIGS. 1 and 2, the connector 22 includes a roller 38 disposed at the second end portion, or lower portion, for bearing engagement with the eccentric cam 20. The eccentric cam 20 may have a circumferential cam groove 40 at its peripheral edge that extends radially inwardly, and the cam groove 40 may be configured to receive and guide the roller 38 as the cam 20 rotates during operation. A biasing member 42, such as a spring, may be disposed between the housing bore 14 and the first end portion or upper portion of the connector 22, and may be configured to bias the connector 22 along the longitudinal axis 15, downward in the illustrated configuration, toward the eccentric cam 20. In this manner, the biasing member 42 may extend and contract in response to the axial movement of the connector 22, and helps to maintain the driving engagement between the connector 22 and the cam 20.

In the illustrated embodiment, the roller 38 is configured as a free-floating spherical ball rotatably contained and captured within a recess 43 at the second end portion of the connector 22. The free-floating spherical ball is free to rotate along any axis within the recess 43 relative to the connector 22. Such a configuration may enable the connector 22 to freely rotate about the longitudinal axis 15 relative to and within the housing bore 14 as the connector is driven in reciprocating axial motion within the housing bore 14. This may reduce lateral loading of the connector 22 against the housing surface defining the bore 14, which typically may be caused by misalignments between the connector 22 and the cam 20, or between the connector 22 and the piston 16. Such a configuration may further eliminate the need for an alignment key that typically constrains rotational movement between the connector 22 and the housing surface defining the bore 14.

The connector 22 may have a coupling 44 at its first end portion, or upper portion, that is configured to engage the piston 16 for enabling common reciprocating axial movement of both the piston 16 and the connector 22 within the housing bore 14. The coupling 44 also may be configured to enable relative rotation of the connector 22 relative to the piston 16 about the longitudinal axis 15. For example, in the illustrated embodiment, the coupling 44 includes a transverse slot 45 that is configured to slidably receive a corresponding protrusion 46 toward an end of the piston 16. The transverse slot 45 may be open to its lateral side and may enclose and engage an upper portion of the protrusion 46. The transverse slot 45 further includes a through-hole 47, or vertical slot, configured to receive a stem portion 48 of the piston 16. Such a configuration may provide positive engagement between the connector 22 and the piston 16 for reciprocating axial movement within the housing bore 14. The exemplary configuration also may provide sufficient sliding and rotational movement between the connector 22 and the piston 16, which may reduce the potential for concentricity or binding issues between these components.

As shown in the embodiment in FIG. 1, different piston configurations may be provided having different diameters. In some embodiments, the different pistons also may have different lengths. In the illustrated embodiment, the different pistons also may have different protrusion or stem portion configurations for cooperating with the connector. For example, the piston 16 has a protrusion 46 adapted to fit within the slot 45, and the piston stem portion 48 has the same diameter as a major portion of the piston 16. The pistons 16' have a larger diameter major portion, and the stem portion 48 that extends through the coupling through-hole 47 is configured as an undercut. The piston 16" has a smaller diameter major portion, and the stem portion 48 is configured as a step having a larger diameter than the major portion. In this manner, the respective stem portions or protrusions of the different pistons may have standard diameter(s) adapted to fit within a standard diameter through-hole or standard sized transverse slot of the connector. The ability to use different sized pistons that engage with the same connector configuration in this way may enhance the modularity and flexibility of the design of the lubrication pump to provide a wider variety of desired flow characteristics.

The exemplary lubrication pump 10 also may include a cylinder assembly 50 disposed within an upper portion of the internal housing bore 14. The cylinder assembly 50 may include a cylinder sleeve 52 defining an internal cylinder bore 54, a check valve 56 disposed within the internal cylinder bore 54, and a plug 58 or other closure disposed toward an upper end of the internal cylinder bore 54.

The cylinder sleeve 52 is configured to slidably receive the piston 16 in the internal cylinder bore 54 via an opening toward a lower end of the sleeve 52 opposite the plug 58. The internal cylinder bore 54 may be coaxial with the internal housing bore 14 and the piston 16 may slidably move in reciprocating motion along the longitudinal axis 15 within the internal cylinder bore 54. The cylinder sleeve 52 may be removably disposed within the internal housing bore 54 via an attachment, such as via threads 59, or the like. As shown, the cylinder sleeve 52 may extend through the internal housing bore 14 from an upper end of the housing to the intermediate chamber 28.

As shown in the illustrated embodiment, different cylinder sleeve configurations 52, 52', 52" may be interchangeably disposed within the housing bores 14. The interchangeable cylinder sleeves 52, 52', 52" may have the same external configuration for being disposed within the internal housing bores 14, but may have different internal cylinder bore configurations (e.g., 54) for slidingly cooperating with the different sized pistons 16, 16', 16". In addition, as discussed above, the different sized pistons 16, 16', 16' may easily be adapted to drivingly engage with the same connector configuration (e.g., 22) simply by adapting the piston protrusion (e.g., 46) and the piston stem (e.g., 48) to be received within the connector coupling (e.g., 44). Such flexibility and modularity in the lubrication pump design provides the ability to easily adapt the different sized pistons 16, 16', 16" and corresponding cylinder sleeves 52, 52', 52", which may enhance the range or adjustability of lubricant fluid output flow provided by the pump 10.

Figure 3A:
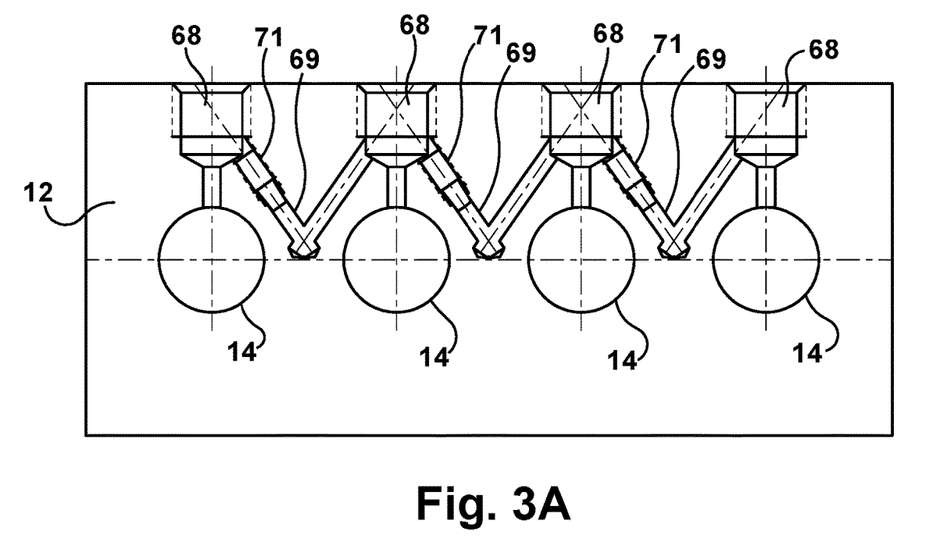
FIG. 3A is a cross-sectional top view of the lubrication pump in FIG. 1 taken about the line A-A.
Figure 3B:
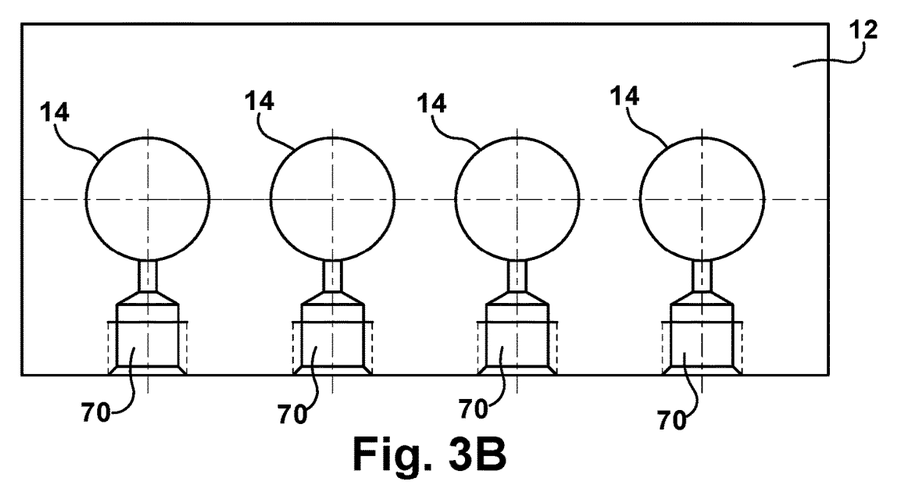
FIG. 3B is a cross-sectional top view of the lubrication pump in FIG. 1 taken about the line B-B.
Figure 4:
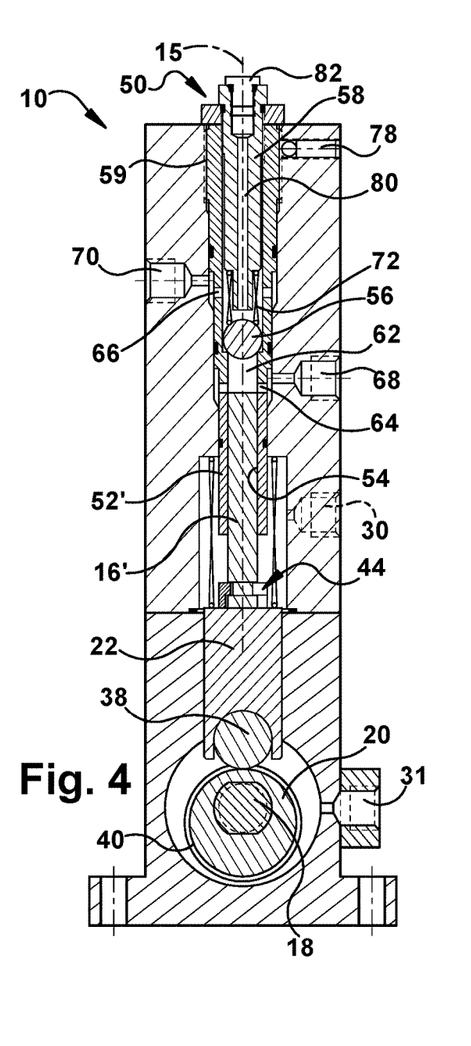
FIGS. 4-6 are cross-sectional end views of the lubrication pump in FIG. 1 taken about the line C-C, which show different states of operation of the lubrication pump.

The cylinder sleeve 52 has a cylindrical wall having an internal cylinder surface 60 that defines the internal cylinder bore 54. The internal cylinder surface 60 cooperates with an end of the reciprocating piston 16 and the check valve 56 to define a fluid chamber 62. The fluid chamber 62 has a variable volume depending on the position of the piston 16 within the cylinder bore 54. The cylinder sleeve 52 has an inlet through passage 64 and an outlet through passage 66, each of which extend through the cylinder wall to the fluid chamber 62. As shown in FIGS. 3A to 4, the housing 12 includes a supply fluid passage 68 for supplying lubricant fluid to the lubrication pump 10, such as from a reservoir (not shown), and an exhaust fluid passage 70 for delivering the lubricant fluid from the lubrication pump 10, such as to a machine or other equipment to be lubricated. The fluid chamber 62 is in fluid communication with the supply fluid passage 68 via the inlet through passage 64, and is in fluid communication with the exhaust fluid passage 70 via the outlet through passage 66.

As shown in FIGS. 3A and 3B, each of the respective internal housing bores 14 may be in fluid communication with both a supply fluid passage 68 and an exhaust fluid passage 70. This may enable the lubrication pump 10 to supply one or more different types of lubricant, or may enable the lubrication pump 10 to supply lubricant at different flow rates via the respective bores 14. In exemplary embodiments, the respective supply fluid passages 68 may be fluidly connected together via cross-passages 69 to allow flow sharing between the respective bores 14. A plug 71 or other closure may be removably disposed in each of the cross-passages 69 to block fluid flow between the respective bores 14.

Figure 5:
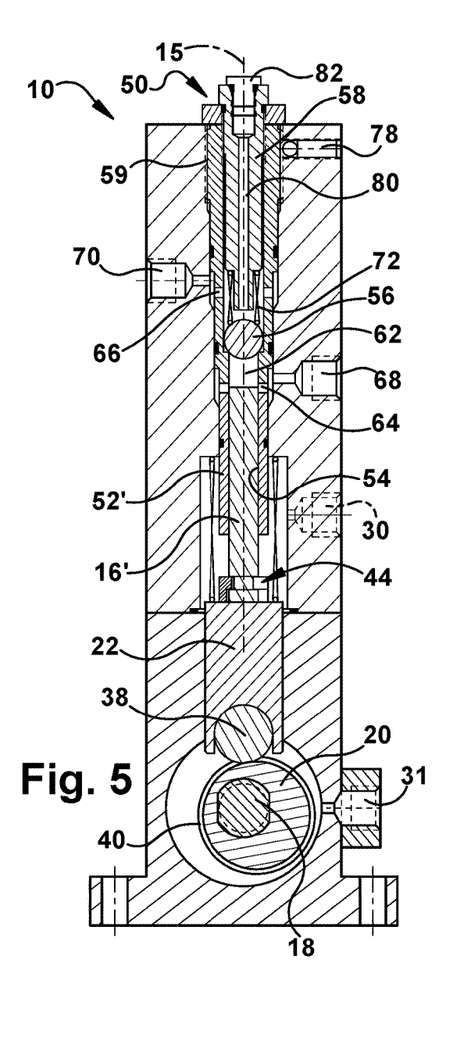
Figure 6:
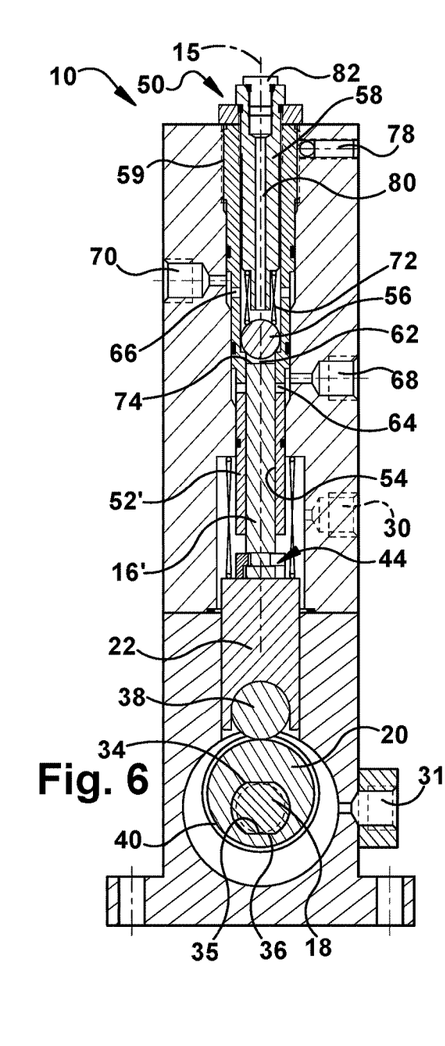

Referring to FIGS. 4-6, cross-sectional side views of the exemplary lubrication pump 10 are shown at various states of operation. Referring to FIG. 4, the piston 16' is shown in a first displaced position, or downstroke position. In the downstroke position, the connector 22 is drivingly engaged with the eccentric cam 20 via the roller 38 within the cam groove 40. In this position, the connector 22 engages the cam 20 at a radially inward portion of the eccentric. The biasing member 42 is extended in this state to bias the connector 22 against the cam 20. When the piston 16' is moved toward the downstroke position, an axial end portion of the piston 16' clears the inlet through passage 64 thereby opening a supply flow path that enables lubricant fluid to flow from the supply inlet passage 68 to the fluid chamber 62 via the inlet through passage 64. The check valve 56 includes a biasing member 72 interposed between the plug 58 and the check valve 56, which may be configured as a ball. The biasing member 72 is configured to normally bias the check valve 56 against a valve seat 74 to close an exhaust flow path from the fluid chamber 62 to the outlet through passage 66. In this manner, when the piston 16' moves from an upstroke position (shown in FIG. 6) to the downstroke position (shown in FIG. 4), the piston 16' may create a vacuum in the fluid chamber 62 which draws lubricant fluid into the fluid chamber 62 where the fluid is contained until the piston 16' strokes back toward the upstroke position.

Referring to FIG. 5, the piston 16' is shown in an intermediate position between the downstroke position (shown in FIG. 4) and the upstroke position (shown in FIG. 6). In the intermediate position, the roller 38 rolls along the cam groove 40 as the cam 20 rotates, whereby the roller 38 transfers force from the cam 20 to the connector 22. The connector 22 imparts this force to the piston 16' via the coupling 44 to move the piston 16' upwardly within the cylinder bore 54 along the longitudinal axis 15. In the illustrated state, the piston 16' begins to obstruct the inlet through passage 64, thereby closing the supply flow path between the supply inlet passage 68 and the fluid chamber 62. As the piston 16' continues to stroke upward, the pressure of the lubricant fluid in the fluid chamber 62 exerts a force against the check valve 56.

Referring to FIG. 6, the piston 16' is shown in a second displaced position, or upstroke position. In the upstroke position, the connector 22 is drivingly engaged with the eccentric cam 20 via the roller 38 within the cam groove 40. In this position, the connector 22 engages the cam 20 at a radially outer portion of the eccentric. The biasing member 42 is compressed in this state and maintains a biasing force of the connector 22 against the cam 20. When the piston 16' is moved toward the upstroke position from the intermediate position, the piston 16' obstructs the inlet through passage 64, thereby closing the supply flow path. As the piston 16' continues to stroke upward the lubricant fluid pressure in the fluid chamber 62 generates enough force to overcome the force from the biasing member 72 to activate the check valve 56. When the check valve 56 is activated, the check valve 56 disengages from the valve seat 74 to open the exhaust flow path from the fluid chamber 62 to the exhaust fluid passage 70 via the outlet through passage 66, thereby enabling the lubricant fluid to be discharged from the lubrication pump 10. As the cam 20 continues to rotate, the biasing member 42 urges the connector 22 downward against the cam 20, and the connector 22 engaging the piston 16' then moves the piston 16' back toward the downstroke position, thereby deactivating the check valve 56 and drawing additional lubricant fluid into the fluid chamber 62 via the inlet through passage 64, and the process described above is repeated.

In exemplary embodiments, the cylinder sleeve 52 (including cylinder sleeves 52', 52") may be axially adjustable upwards or downwards relative to the internal housing bore 14 and/or the piston 16. Such axial adjustment of the cylinder sleeve 52 increases or decreases a maximum volume of the variable fluid chamber 62, thereby increasing or decreasing the amount of fluid flow that can be supplied from the supply fluid passage 68 to the exhaust fluid passage 70. The adjustment of the cylinder sleeve 52 may be made via the threads 59 on an outer surface of the cylinder sleeve 52 and corresponding threads on an inner surface of the internal housing bore 14, such that threading the cylinder sleeve 52 downward into the bore 14 toward the piston 16 decreases the maximum volume of the variable fluid chamber 62, which reduces output lubricant fluid flow; and threading the cylinder sleeve 52 upward out of the bore 14 away from the piston 16 increases the maximum volume of the variable fluid chamber 62, which increases output lubricant fluid flow. Such a configuration enables the output lubricant fluid flow of the pump 10 to be easily adjusted as desired.

The position of the cylinder sleeve 52 along the longitudinal axis 15 may be fixed. A set screw 78 may be used in the adjustment, such that the set screw 78 may be moved toward a first position that engages an outer surface of the cylinder sleeve 52 to fix the cylinder sleeve in position, or may the set screw 78 may be moved to a second position away from the outer surface of the cylinder sleeve 52 to enable axial adjustment of the cylinder sleeve 52. The set screw 78 may include a deformable material, such as a Teflon ball, at a distal end to engage the threads 59 or the cylinder sleeve 52 and hold the cylinder sleeve 52 in place without damaging the threads 59.

The cylinder assembly 50 also may provide a flow path for trapped gas to escape from the housing 12. For example, as shown in the illustrated embodiment, the plug 58, which is threaded into an upper end portion of the internal cylinder bore 54, includes a vertical through-passage 80 having a first end that opens to the fluid chamber 62 and a second end opposite the first end that opens to outside of the housing 12 for enabling such trapped gas to escape. The through-passage 80 also may have a plug 82 or other closure disposed within an end portion thereof to close the passage 80 after the gas has escaped or been purged from the housing 12.

In summary, an exemplary lubrication pump for an exemplary lubrication system has been described herein and shown in the accompanying drawings. The lubrication pump 10 includes a housing 12 defining a bore 14 and a piston 16 slidably movable within the bore 14. A connector 22 may be drivingly interposed between a cam 20 and the piston 16 for driving the piston 16 in reciprocating axial motion along a longitudinal axis 15. The connector 22 may have a coupling 44 for engaging the piston 16, which may enable slidable or rotational engagement between the connector 22 and piston 16. The connector 22 may have a roller 38 for bearing engagement with the cam 20, which may enable the connector 22 to rotate about the longitudinal axis 15 relative to the housing 12 as the connector 22 moves axially within the bore 14. The cam 20 may be laterally displaceable relative to the connector 22. An adjustable cylinder sleeve 52 may be disposed within the bore 14 for cooperating with the piston 16. The cylinder sleeve 52 may be axially adjustable relative to the piston 16 for varying lubricant fluid output flow. The cylinder sleeve 52 and corresponding piston 16 may be interchangeably disposed in the housing 12.

The exemplary lubrication pump may reduce the need for accurate alignment of pump components, which may reduce lateral wear during operation, and which also may reduce the cost and time to manufacture the pump.

The exemplary lubrication pump also may facilitate adjustment of the flow of lubricant through the pump, and may enable a broader range of lubricant output flow provided by the pump.

According to one aspect of the invention, a lubrication pump includes a housing defining an internal housing bore having a longitudinal axis; a piston slidably movable within the internal housing bore along the longitudinal axis; a drive shaft having an eccentric cam, the eccentric cam being rotatable with the drive shaft relative to the housing; and a connector drivingly interposed between the eccentric cam and the piston, the connector having a first end portion configured to engage the piston and a second end portion opposite the first end portion configured to engage the eccentric cam; where the connector includes a roller disposed at the second end portion, the roller being in bearing engagement with the eccentric cam thereby enabling the connector to drive the piston in reciprocating movement along the longitudinal axis in response to the rotation of the eccentric cam.

Embodiments of the invention may include one or more of the following additional features separately or in combination.

For example, the roller may be a spherical ball rotatably disposed within a recess of the connector such that the connector is free to rotate about the longitudinal axis relative to the housing.

The connector may be slidably movable within the internal housing bore along the longitudinal axis.

The connector may be laterally constrained by an internal surface of the housing that defines the internal housing bore.

The connector may have a slot at the first end portion, the slot being configured to engage a corresponding protrusion of the piston for enabling common reciprocating movement of both the piston and the connector.

The slot of the connector may be configured to receive the protrusion of the piston for enabling rotation of the connector about the longitudinal axis relative to the piston.

The eccentric cam may have a circumferential cam groove configured to receive and guide the spherical ball as the eccentric cam rotates during use.

The drive shaft may be disposed transverse to the internal housing bore.

The eccentric cam may be slidably disposed on the drive shaft such that the eccentric cam is laterally displaceable relative to the connector for enabling self-alignment between the connector and the eccentric cam.

The eccentric cam may define a through-hole having opposite flat sides, and the opposite flat sides of the through-hole may be configured to engage corresponding flat sides of the drive shaft for enabling the drive shaft to drivingly rotate the eccentric cam.

The lubrication pump may further include a biasing member configured to bias the connector toward the eccentric cam.

The housing may include a supply fluid passage and an exhaust fluid passage.

The piston may be disposed within the internal housing bore to define at least a portion of a fluid chamber in fluid communication with the supply fluid passage and the exhaust fluid passage.

The piston may be movable within the internal housing bore between a first position that opens a supply flow path to draw fluid into the fluid chamber from the supply fluid passage, and a second position that closes the supply flow path and forces the fluid out of the fluid chamber to the exhaust fluid passage.

The lubrication pump may further include a cylinder sleeve disposed within the internal housing bore, where the cylinder sleeve defines an internal cylinder bore.

The piston may be reciprocatingly disposed within the internal cylinder bore to define at least a portion of the fluid chamber in fluid communication with the supply fluid passage and the exhaust fluid passage.

The cylinder sleeve may be axially adjustable relative to the internal housing bore to increase or decrease a volume of the fluid chamber for varying an amount of lubricant fluid flow from the supply fluid passage to the exhaust fluid passage.

The housing may further include a set screw having a first position that enables the cylinder sleeve to be fixed in position, and a second position that enables axial adjustment of the cylinder sleeve.

The cylinder sleeve may include an inlet through passage and an outlet through passage each extending through a wall of the cylinder sleeve that defines the internal cylinder bore.

The inlet through passage and the outlet through passage may each extend through the wall at axially-spaced locations.

When the piston moves to the first position, the supply flow path may be opened to enable fluid flow from the supply fluid passage to the fluid chamber via the inlet through passage, and when the piston moves to the second position, the supply flow path may be closed and fluid in the fluid chamber is discharged to the exhaust fluid passage via the outlet through passage.

The cylinder sleeve may include a plug disposed toward a first end portion of the internal cylinder bore that is opposite a second end portion of the internal cylinder bore that receives the piston.

The plug may include a through passage having a first end that opens to the fluid chamber and a second end opposite the first end that opens to outside of the housing for enabling trapped gas to escape from inside of the housing.

The lubrication pump may further include a spring-biased check valve biased toward closing an exhaust flow path between the fluid chamber and the exhaust fluid passage, and configured to open the exhaust flow path when the piston moves toward the second position.

According to another aspect of the invention, a lubrication pump includes a housing defining an internal housing bore having a longitudinal axis; a piston slidably movable within the internal housing bore along the longitudinal axis; a drive shaft having an eccentric cam, the eccentric cam being rotatable with the drive shaft relative to the housing; and a connector drivingly interposed between the eccentric cam and the piston, the connector having a first end portion configured to engage the piston and a second end portion opposite the first end portion configured to engage the eccentric cam; where the connector includes a free-floating ball disposed at the second end portion, and the eccentric cam has a circumferential cam groove configured to receive and guide the free-floating ball; and where the eccentric cam is slidably disposed on the drive shaft such that the eccentric cam is laterally displaceable along the drive shaft relative to the connector for enabling self-alignment between the connector and the eccentric cam when the free-floating ball is guidably received in the circumferential cam groove.

Embodiments of the invention may include one or more of the following additional features separately or in combination.

For example, the connector may be configured to capture the free-floating ball within a recess at the second end portion such that the connector is free to rotate about the longitudinal axis relative to the housing.

The connector may have a coupling at the first end portion, the coupling being configured to receive the piston for enabling rotation of the connector about the longitudinal axis relative to the piston.

According to another aspect of the invention, a lubrication pump includes a housing defining an internal housing bore having a longitudinal axis, the housing having a supply fluid passage and an exhaust fluid passage; a cylinder sleeve disposed within the internal housing bore, the cylinder sleeve having an internal cylinder surface defining an internal cylinder bore; a piston slidably movable within the internal cylinder bore along the longitudinal axis, the piston cooperating with the internal cylinder surface to define a variable fluid chamber; and a drive shaft having an eccentric cam, the eccentric cam being rotatable with the drive shaft relative to the housing and configured to drive the piston in reciprocating motion along the longitudinal axis within the internal cylinder bore; where the cylinder sleeve is axially adjustable relative to the internal housing bore to vary a volume of the variable fluid chamber.

Embodiments of the invention may include one or more of the following additional features separately or in combination.

The cylinder sleeve may include an inlet through passage and an outlet through passage each extending through a wall of the cylinder sleeve.

The inlet through passage may be in fluid communication with the supply fluid passage and the fluid chamber.

The outlet through passage may be in fluid communication with the exhaust fluid passage and the fluid chamber.

When the piston moves toward a first position, a supply flow path may be opened to enable fluid flow from the supply fluid passage to the fluid chamber via the inlet through passage, and when the piston moves toward a second position, the supply flow path may be closed and an exhaust flow path may be opened to enable fluid flow from the chamber to the exhaust fluid passage via the outlet through passage.

The lubrication pump may further include a connector drivingly interposed between the eccentric cam and the piston.

The connector may have a first end portion configured to engage the piston and a second end portion opposite the first end portion configured to engage the eccentric cam thereby enabling the connector to drive the piston in reciprocating movement along the longitudinal axis within the internal cylinder bore in response to the rotation of the eccentric cam.

The connector may include a ball rotatably disposed at the second end portion, the connector being configured to contain the ball within a recess at the second end portion such that the connector is free to rotate about the longitudinal axis relative to the housing when the ball engages the eccentric cam during operation.

The connector may have a slot at the first end portion.

The slot may be configured to engage a corresponding protrusion of the piston for enabling common reciprocating movement of the piston and the connector.

The slot may be configured to slidably receive the protrusion of the piston for enabling rotation of the connector about the longitudinal axis relative to the piston.

According to another aspect of the invention, a method of assembling a lubrication pump having a housing defining an internal housing bore, including one or more of the following steps alone or in combination:

(i) slidably disposing an eccentric cam having a radially outward groove on a drive shaft;

(ii) mounting the drive shaft in the housing transversely to the internal housing bore;

(iii) generally aligning the eccentric cam with the internal housing bore, the eccentric cam being freely displaceable laterally with respect to the internal housing bore;

(iv) slidably disposing a connector in the internal housing bore, the connector having a roller toward a first end thereof; and (v) engaging the roller with the circumferential cam groove of the eccentric cam to align the connector with the eccentric cam.

Embodiments of the invention may include one or more of the following additional features separately or in combination.

The connector may include a transverse slot at a second end portion opposite the first end portion.

The method may further include slidably disposing a piston within the transverse slot such that the piston and the connector are rotatable and/or slidably relative to each other during use.

The method may further include disposing a cylinder sleeve within the internal housing bore, the cylinder sleeve defining an internal cylinder bore; and slidably disposing the piston in the internal cylinder bore.

According to another aspect of the invention, a method of adjusting pump output flow of a lubrication pump having a housing defining an internal housing bore, the housing having a supply fluid passage and an exhaust fluid passage; a cylinder sleeve disposed within the internal housing bore, the cylinder sleeve having an internal cylinder surface defining an internal cylinder bore; a piston slidably movable within the internal cylinder bore along a longitudinal axis, the piston cooperating with the internal cylinder surface to define a variable fluid chamber, the method comprising: adjusting the axial position of the cylinder sleeve relative to the internal housing bore to vary a volume of the variable fluid chamber.

According to another aspect of the invention, a method of adjusting pump output flow of lubrication pump having a housing defining an internal housing bore, the housing having a supply fluid passage and an exhaust fluid passage; a cylinder sleeve removably disposed within the internal housing bore, the cylinder sleeve having an internal cylinder surface defining an internal cylinder bore; a piston slidably movable within the internal cylinder bore along a longitudinal axis, the piston cooperating with the internal cylinder surface to define a variable fluid chamber, the method comprising: interchanging the cylinder sleeve and the piston with a different cylinder sleeve and a different piston, the different cylinder sleeve having a larger or smaller diameter of the internal cylinder bore, and the different piston having a larger or smaller diameter major portion configured to be slidably disposed in the internal cylinder bore of the different cylinder sleeve.

In the discussion above, the terms "upper", "lower", "top", "bottom," "end," "inner," "left," "right," "above," "below," "horizontal," "vertical," etc. refer to an arbitrary frame of reference, as shown in FIG. 1, for example. This is done realizing that the lubrication pump can be mounted or transported in various other orientations and the invention is not limited to the illustrated orientations.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention.

The invention claimed is:

1. A lubrication pump comprising:
 a housing defining an internal housing bore having a longitudinal axis, the housing having a supply fluid passage and an exhaust fluid passage;
 a cylinder sleeve disposed within the internal housing bore, the cylinder sleeve having an internal cylinder surface defining an internal cylinder bore;
 a piston slidably movable within the internal cylinder bore along the longitudinal axis, the piston cooperating with the internal cylinder surface to define a fluid chamber; and
 a drive shaft having an eccentric cam, the eccentric cam being rotatable with the drive shaft relative to the housing and configured to drive the piston in reciprocating motion along the longitudinal axis within the internal cylinder bore between an upstroke position and a downstroke position;
 where the cylinder sleeve has an inlet fluid passage in fluid communication with the supply fluid passage of the housing for permitting fluid to enter the fluid chamber, and the cylinder sleeve has an outlet fluid passage in fluid communication with the exhaust fluid passage of the housing for permitting the fluid to exit the fluid chamber; and
 where the cylinder sleeve is axially adjustable relative to the internal housing bore to vary an axial location of the inlet fluid passage relative to the piston in the upstroke position to thereby vary an amount of fluid output flow from the fluid chamber.

2. The lubrication pump according to claim 1,
 where, when the piston moves toward the downstroke position, a supply flow path is opened to enable fluid flow from the supply fluid passage to the fluid chamber via the inlet fluid passage, and when the piston moves toward the upstroke position, the supply flow path is closed and an exhaust flow path is opened to enable fluid flow from the chamber to the exhaust fluid passage via the outlet fluid passage.

3. The lubrication pump according to claim 1, further comprising:
 a spring-biased check valve biased toward closing an exhaust flow path between the fluid chamber and the exhaust fluid passage, and configured to open the exhaust flow path when the piston moves toward the upstroke position;
 a connector drivingly interposed between the eccentric cam and the piston, the connector having a first end portion configured to engage the piston and a second end portion opposite the first end portion configured to engage the eccentric cam thereby enabling the connector to drive the piston in reciprocating movement along the longitudinal axis within the internal cylinder bore in response to the rotation of the eccentric cam; and
 a biasing member configured to bias the connector toward the eccentric cam;
 where the connector includes a ball rotatably disposed at the second end portion, the connector being configured to contain the ball within a recess at the second end portion such that the connector is free to rotate about the longitudinal axis relative to the housing when the ball engages the eccentric cam during operation; and
 where the connector has a slot at the first end portion, the slot being configured to engage a corresponding protrusion of the piston for enabling common reciprocating movement of the piston and the connector, and where the slot is configured to slidably receive the protrusion of the piston for enabling rotation of the connector about the longitudinal axis relative to the piston.

4. The lubrication pump according to claim 1, where the cylinder sleeve is threaded into the internal housing bore, the cylinder sleeve having a portion that is exposed outwardly of the housing for enabling adjustment of an axial position of the cylinder sleeve.

5. The lubrication pump according to claim 1, further comprising:
a cylinder assembly disposed in the internal housing bore of the housing, the cylinder assembly having the cylinder sleeve and a check-valve, the check valve being disposed in the internal cylinder bore of the cylinder sleeve between the inlet fluid passage and the outlet fluid passage;
where the check valve has a biasing member that biases the check valve toward closing the outlet fluid passage, and the check valve is configured to open the outlet fluid passage when pressure in the fluid chamber exerts a force that is greater than a force provided by the biasing member.

6. The lubrication pump according to claim 5, where the cylinder assembly is axially movable relative to the internal housing bore to thereby cause corresponding axially movement of the cylinder sleeve and the check valve.

7. The lubrication pump according to claim 1, further comprising:
a connector drivingly interposed between the eccentric cam and the piston, the connector having a first end portion configured to engage the piston and a second end portion opposite the first end portion configured to engage the eccentric cam;
where the connector includes a roller disposed at the second end portion, the roller being in bearing engagement with the eccentric cam thereby enabling the connector to drive the piston in reciprocating movement along the longitudinal axis in response to the rotation of the eccentric cam.

8. The lubrication pump according to claim 7, where the roller is a spherical ball rotatably disposed within a recess of the connector such that the connector is free to rotate about the longitudinal axis relative to the housing.

9. The lubrication pump according to claim 8, where the eccentric cam has a circumferential cam groove configured to receive and guide the spherical ball as the eccentric cam rotates during use.

10. The lubrication pump according to claim 7, where the connector is slidably movable within the internal housing bore along the longitudinal axis, and is laterally constrained by an internal surface of the housing that defines the internal housing bore.

11. The lubrication pump according to claim 7,
where the connector has a slot at the first end portion, the slot being configured to engage a corresponding protrusion of the piston for enabling common reciprocating movement of both the piston and the connector; and
where the slot of the connector is configured to receive the protrusion of the piston for enabling rotation of the connector about the longitudinal axis relative to the piston.

12. The lubrication pump according to claim 7, where the drive shaft is disposed transverse to the internal housing bore, and where the eccentric cam is slidably disposed on the drive shaft such that the eccentric cam is laterally displaceable relative to the connector for enabling self-alignment between the connector and the eccentric cam.

13. The lubrication pump according to claim 7, where the eccentric cam has a through-hole having opposite flat sides, and where the opposite flat sides of the through-hole are configured to engage corresponding flat sides of the drive shaft for enabling the drive shaft to drivingly rotate the eccentric cam.

14. The lubrication pump according to claim 7, further including a biasing member configured to bias the connector toward the eccentric cam.

15. The lubrication pump according to claim 1, where the housing further includes a set screw having a first position that enables the cylinder sleeve to be fixed in position, and a second position that enables axial adjustment of the cylinder sleeve.

16. The lubrication pump according to claim 1,
where the inlet fluid passage and the outlet fluid passage each extend through a wall of the cylinder sleeve that defines the internal cylinder bore, the inlet fluid passage and the outlet fluid passage extending through the wall at axially-spaced locations; and
where, when the piston moves to the downstroke position, a supply flow path is opened to enable fluid flow from the supply fluid passage to the fluid chamber via the inlet fluid passage, and when the piston moves to the upstroke position, the supply flow path is closed and fluid in the fluid chamber is discharged to the exhaust fluid passage via the outlet fluid passage.

17. The lubrication pump according to claim 1,
where the cylinder sleeve includes a plug disposed toward a first end portion of the internal cylinder bore that is opposite a second end portion of the internal cylinder bore that receives the piston; and
where the plug includes a through passage having a first end that opens to the fluid chamber and a second end opposite the first end that opens to outside of the housing for enabling trapped gas to escape from inside of the housing.

18. The lubrication pump according to claim 1, further comprising a spring-biased check valve biased toward closing an exhaust flow path between the fluid chamber and the exhaust fluid passage, and configured to open the exhaust flow path when the piston moves toward the upstroke position.

19. The lubrication pump according to claim 1, further comprising:
a housing defining an internal housing bore having a longitudinal axis;
a connector drivingly interposed between the eccentric cam and the piston, the connector having a first end portion configured to engage the piston and a second end portion opposite the first end portion configured to engage the eccentric cam;
where the connector includes a free-floating ball disposed at the second end portion, and the eccentric cam has a circumferential cam groove configured to receive and guide the free-floating ball; and
where the eccentric cam is slidably disposed on the drive shaft such that the eccentric cam is laterally displaceable along the drive shaft relative to the connector for enabling self-alignment between the connector and the eccentric cam when the free-floating ball is guidably received in the circumferential cam groove.

20. The lubrication pump according to claim 19,
where the connector is configured to capture the free-floating ball within a recess at the second end portion such that the connector is free to rotate about the longitudinal axis relative to the housing; and where the connector has a coupling at the first end portion, the coupling being configured to receive the piston for enabling rotation of the connector about the longitudinal axis relative to the piston.

\* \* \* \* \*